(12) United States Patent
Idetsu et al.

(10) Patent No.: US 6,390,572 B1
(45) Date of Patent: May 21, 2002

(54) CRAWLER BELT

(75) Inventors: Wataru Idetsu, Chiyoda-machi; Genroku Sugiyama, Miho-mura; Yoshiaki Sekiguchi, Yasato-machi; Kazuyoshi Hatano, Minori-machi, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/600,284

(22) PCT Filed: Apr. 19, 2000

(86) PCT No.: PCT/JP99/06609

§ 371 Date: Jul. 14, 2000

§ 102(e) Date: Jul. 14, 2000

(87) PCT Pub. No.: WO00/32463

PCT Pub. Date: Jun. 8, 2000

(30) Foreign Application Priority Data

Dec. 3, 1998 (JP) .......................................... 10-344672
Apr. 26, 1999 (JP) .......................................... 11-118593

(51) Int. Cl.⁷ .......................... B60S 1/62; B62D 25/16; F16F 1/34
(52) U.S. Cl. ...................... 305/103; 305/104; 305/106
(58) Field of Search ............... 305/100, 101, 305/103 I, 104, 106, 124, 126, 129, 130

(56) References Cited

U.S. PATENT DOCUMENTS

| | | | | |
|---|---|---|---|---|
| 3,389,921 A | * | 6/1968 | Lojkutz | 305/103 |
| 4,568,090 A | * | 2/1986 | Westemeier | 305/103 |
| 4,819,999 A | * | 4/1989 | Livesay et al. | 305/101 |
| 5,374,115 A | | 12/1994 | Ketting | |
| 6,105,969 A | * | 8/2000 | Anderton et al. | 305/103 |
| 6,139,020 A | * | 10/2000 | Friend et al. | 305/100 |
| 6,176,491 B1 | * | 1/2001 | Bertoni | 305/100 |

FOREIGN PATENT DOCUMENTS

| | | |
|---|---|---|
| JP | 48-27535 | 8/1971 |
| JP | 49-113342 | 1/1973 |
| JP | 50-23945 | 7/1975 |
| JP | 51-56731 | 5/1976 |
| JP | 55-149477 | 10/1980 |
| JP | 2-93170 | 4/1990 |
| JP | 6-503282 | 4/1994 |

* cited by examiner

*Primary Examiner*—S. Joseph Morano
*Assistant Examiner*—Jason R. Bellinger
(74) *Attorney, Agent, or Firm*—Mattingly, Stanger & Malur, P.C.

(57) ABSTRACT

The present invention concerns a crawler belt (7) incorporating a sealing devices (21), which are each constituted by a coned disc spring (23) and a seal ring (22), to seal up gap spaces between track links (8) and bushes (13). A seal anchor hole (12) is provided in each one of outer link portions (9) of track links (8) of the crawler belt (7), and the sealing device (21) is fitted in the seal anchor hole (12) between an outer link portion (9) and an opposing end face (13A) of a bush (13). The sealing device (21) includes the seal ring (22) in the shape of an O-ring, and the coned disc spring (23) which is arranged to press the seal ring (22) resiliently against peripheral wall surface (12B) of the seal anchor hole (12) and the end face (13A) of the bush (13).

11 Claims, 17 Drawing Sheets

CRAWLER BELT

TECHNICAL FIELD

This invention relates to a crawler belt suitable for use on crawler type vehicles such as hydraulic excavators, hydraulic cranes and the like.

BACKGROUND ART

Generally, crawler type vehicles such as hydraulic excavators are equipped with crawler belts for running or traveling purposes. Crawler belts of this sort are usually constituted by; right and left track links each having outer and inner link portions along opposite longitudinal sides thereof; bushes located transversely between inner link portions of the respective track links, and having transversely opposite ends of the respective bushes located in confronting relation with the outer link portions of the track links; connecting pins inserted in the respective bushes and having transversely opposite ends fitted and securely fixed in the outer link portions; and seal devices provided between the bushes and the outer link portions of the respective track links (e.g., as disclosed in Japanese Laid-Open Utility Model Publication No. S48-27535 and S49-113342).

The prior art crawler belts of this sort are each passed around an idle wheel and a drive wheel, and, as the drive wheel is rotated by a hydraulic motor or the like, the crawler belts are turned around between the idle and drive wheels to move a vehicle body in a forward or reverse direction.

Further, in the case of the prior art crawler belts just mentioned, rubber seals such as urethane rubber seals on the like are fitted between the bushes and outer link portions of track links to prevent intrusion of dirt or soil into gaps between the bushes and connecting pins, and at the same time to prevent leakage of grease which lubricates these members.

On the other hand, as another example of the prior art, there have been known crawler belts of a construction employing steel coned disc spring in place of the above-mentioned rubber seals for sealing gaps between the bushes and outer link portions of track links (e.g., as disclosed in Japanese Utility Model Publication No. S50-23945).

In the case of this prior art construction, as the crawler belts are turned around, the coned disc spring are held in sliding contact with end faces of the track links and bushes, thereby applying suitable sliding resistance to adjoining track links to prevent the crawler belts from flapping up and down to a considerably large degree.

Further, in another prior art crawler belt construction, ring-like spacers are fitted on connecting pins at positions between track links and bushes, and the spacers are each provided with a lip seal around its outer periphery for sliding contact with an end face of a bush; in association with a load ring which is adapted to press the lip seal resiliently toward the bush (e.g., as disclosed in Japanese Laid-Open Patent Publication No. H2-93170).

In the case of the prior art construction just mentioned, the thrust load which acts between the bushes and the track links is supported by means of spacers to prevent the thrust load from directly acting on the lip seals, thereby enhancing durability of the lip seals.

By the way, according to the prior art just mentioned, the rubber seals are interposed in a compressed state between the bushes and outer link portions of the track links and resiliently held in sliding contact with end faces of the bushes.

In this regard, in order to further enhance the sealing functions of the rubber seals, an increased compressive load is applied to the rubber seals between the bushes and track links for the purpose of elevating the surface pressure of rubber seals which are in sliding contact with end faces of the bushes.

However, according to published prior art such as Japanese Laid-Open Utility Model Publication No. S48-827535, for example, if the compressive load on rubber seals is increased to an unnecessarily large degree, it will give rise to large sliding resistance between the rubber seals and bushes, causing abrasive wear to sealing surfaces of the rubber seals prematurely in an early stage and as a result deteriorating their sealing functions to a considerable degree.

Especially in case the compressive load is continuously applied to the resilient bodies of the rubber seals over a long period of time, plastic deformation (permanent deformation) could occur to the rubber seals due to fatigue. In such a case, the rubber seals are worn out between the bushes and gaps are opened depending upon the degree of wear to deteriorate their sealing functions.

Further, according to still another prior art construction as shown in Japanese Utility Model Publication No. S50-23945, seals of simple linear contact are formed by arranging coned disc springs in contact with outer link portions of the track links and end faces of the bushes. In this case, the contact areas of the coned disc springs and outer link portions are extremely small and insufficient to provide stable seals. In addition, coned disc springs are susceptible to corrosion or rust which would sooner or later lead to deteriorations in sealing functions.

Further, according to a prior art crawler belt construction as shown in Japanese Laid-Open Patent Publication No. H2-93170, load is applied to lip seals in a compressive direction by means of load rings of synthetic resin or similar resilient material. Naturally, the load rings of synthetic resin material as employed in this prior art are incapable of generating sufficient sliding resistance between the lip seals and bushes, thereby permitting the crawler belts to flap up and down easily during traveling operations to impair the performance quality of the machine in travel.

Furthermore, recently, it often become necessary for the crawler type vehicles of this sort to be moved from a remote working site to a nearby storage station or place which is located within a manageable distance. In such a case, since a transfer of a crawler type vehicle on a truck involves impractically troublesome steps, it has been the general practice to move a crawler type vehicle by itself for a travel to or from a working or storage place. Consequently, the crawler type vehicle is forced to travel over an unduly long distance, and, due to the large sliding resistance acting on the seals which are interposed between track links and bushes, the seals of the above-described prior art constructions lose sealing functions prematurely within a shortened period of time, thereby suffering from a short service life.

DISCLOSURE OF THE INVENTION

In view of the above-mentioned problems with the prior art, it is an object of the present invention to provide a crawler belt which uses seal rings in combination with coned disc springs in such a way as to enhance durability of the seal rings against loads acting in compressive directions, thereby ensuring a stable sealing capacity over a long period of time.

In order to achieve the objective just mentioned, according to the present invention, there is provided a crawler belt which includes right and left track links each consisting of a large number of track links successively connected in an endless form, each one of the track links being provided with an outer link portion at one longitudinal end and an inner link portion at the other longitudinal end thereof; bushes each located transversely between the inner link portions of the right and left track links to have opposite ends thereof in face to face relation with outer link portions of the truck links; connecting pins inserted in the bushes and having opposite ends thereof fitted in and connected to the outer link portions of the track links; and a sealing device located around a connecting pin in a gap spaces between an outer link portion of the track links and an opposing one of the bushes.

The crawler belt construction according to the present invention is characterized in that the sealing devices are each constituted by a seal ring formed of a resilient material in a ring-like shape having a diameter larger than that of the connecting pin and set in position to form a seal between the outer link portion and an opposing end face of the bush; and a coned disc spring interposed in a compressively deformable between the outer link portion and the bush and adapted to press the seal ring resiliently against the outer link portion and the end face of the bush.

With the arrangements just described, a transversely acting load (hereinafter referred to as "thrust load" for brevity) which is imposed on the track links is supported by the coned disc spring of each sealing device between an outer link portion and a bush to suppress transmission of thrust load to the seal ring. Besides, by resilient force of the coned disc spring, the seal ring can be resiliently pressed against the outer link portion and an opposing end face of the bush to seal up the gap space between the outer link portion and the end face of the bush by surface contact.

In one preferred form of the present invention, the outer link portion is provided with a pin fitting hole to receive an end portion of the connecting pin, and a seal anchor hole formed coaxially with the pin fitting hole and adapted to hold the seal ring and coned disc spring of the sealing device between a bottom end surface thereof and the end face of the bush, abutting outer and inner peripheral ends, which are maximum and minimum in diameter, of the coned disc spring against the bottom end surface of the seal anchor hole and the end face of the bush, respectively.

With the arrangements just described, the coned disc spring can be located in a tapered shape converging toward the bush and in such a way as to press the seal ring strongly toward both of the outer link portion and the end face of the bush.

Further, according to the present invention, the end face as a whole of the bush can be constituted by a flat surface which is disposed normal to a longitudinal axis thereof. In this case, the end face of the bush can be machined easily as a perpendicular flat surface.

Alternatively, according to the present invention, the end face of the bush can be constituted by a seal ring abutting surface formed annularly in radially outer portions of the end face, and a circular coned disc spring abutting surface formed radially inward and projected axially outward of the seal ring abutting surface.

In this case, the gap space between the coned disc spring abutting surface and the outer link portion can be narrowed to an extent which corresponds to the length of axial projection of the coned disc spring abutting surface. Therefore, even in the case of a coned disc spring which has a smaller natural length in the transverse direction, it can be assembled into position between the outer link portion and the bush in a compressively deformed state. In addition, it becomes possible to make the gap space between the seal ring abutting surface and the outer link portion wider than the gap space between the coned disc spring abutting surface and the outer link portion for the purpose of securing a broader space from accommodating the seal ring.

Further, according to the present invention, both of the seal ring abutting surface and the coned disc spring abutting surface on the bush can be constituted by flat surfaces which are disposed normal to a longitudinal axis of the bush to provide an annular stepped portion therebetween.

In this case, the seal ring can be fitted on the annular stepped wall portion which is provided between the seal ring abutting surface and the coned disc spring abutting surface, thereby utilizing the stepped wall portion for setting the seal ring in position in the radial direction.

Further, according to the present invention, the seal ring abutting surface can be formed in a conical shape.

In this case, the seal ring abutting surface which is formed in a conical shape is disposed in an inclined state relative to the axis of the bush, so that it becomes possible to broaden the gap space between the coned disc spring and the seal ring abutting surface in proportion to the inclination angle of the latter.

On the other hand, according to the present invention, preferably, the coned disc spring is arranged to be capable of compressive deformation through a maximum flexural deformation distance $L1$ or $L1'$ which is in the relationship of ($S1<L1$ or $S1<L1'$) relative to a width $S1$ of the gap space between the outer and inner link portions of the track links.

With the arrangements just described, flexural deformation of the coned disc spring can be suppressed to a value smaller than its maximum flexural deformation distance $L1$ even when the inner and outer link portions are abutted (collided) against each other by a thrust load acting on the track links to make the gap space between the inner and outer link portions substantially to zero, thereby permitting the coned disc spring to retain excellent resilient force over an extended period of time. Accordingly, the coned disc spring can apply a pressing force on the seal ring to press the latter resiliently and continuously against the outer link portion and the end face of the bush.

Further, according to the present invention, preferably the coned disc spring is arranged to have an initial flexural deformation distance $L2$ or $L2'$ which is in the relationship of ($L2>S1$ or $L2'>S1$) relative to a width $S1$ of a gap space between the outer and inner link portions of the track links.

In this case, even when a thrust load is imposed on the track links to bring outer and inner link portions in one of right and left track links into abutting engagement with each other while spreading apart the gap space between outer and inner link portions in the other track link to a width approximately two times as large as the gap width $S1$ ($2 \times S1$), the coned disc spring can be retained in a resiliently deformed state between the outer and inner link portions. Accordingly, the coned disc spring can press the seal ring resiliently and continuously against the outer link portion and the end face of the bush by applying a resilient force on the seal ring in a stabilized manner.

Further, according to the present invention, preferably the seal ring and the coned disc spring are arranged to have jointly an initial flexural deformation distance $P$ or $P'$ which is larger than a width $S1$ of a gap space between the outer and inner link portions of the track links and set in the relationship of ($P>S1$ or $P'>S1$)

In this case, similarly the coned disc spring can be retained in a resiliently deformable state between the outer and inner link portion even when the gap space between the outer and inner link portions is spread apart to a width approximately two times as large as the gap width S1 (2×S1) by a thrust load acting on the track links. Accordingly, the coned disc spring can apply a resilient force to the seal ring continuously in a stabilized manner.

Further, according to the present invention, preferably the coned disc spring is set between the connecting pin and the seal anchor hole, having an outer peripheral end portion thereof spaced from the seal anchor hole in radial direction by a gap of width S2 or S2' which is smaller than a radial gap space S3 or S3' between an inner peripheral end portion of the coned disc spring and the connecting pin, i.e., in the relationship of (S2<S3 or S2'<S3').

With the arrangements just described, the inner peripheral end portion of the coned disc spring can be retained out of contact with the connecting pin, so that the coned disc spring is prevented from getting into sliding contact with circumferential surfaces of the connecting pin even if the coned disc spring is caused to rotate along with the bush while the track link is being turned around.

Further, according to the present invention, the seal ring and the coned disc spring may be formed separately of each other and set in position in an assembled state between the outer link portion and the end face of the bush. Therefore, at the time of parts replacement of the sealing devices, the seal rings and coned disc springs can be replaced individually and independently of each other.

Furthermore, according to the present invention, the seal ring and the coned disc spring may be formed into and provided as one integral structure. At assembling for the sealing device, the assembling work for the seal ring and coned disc spring separately into the seal anchor hole can be facilitated to a significant degree.

BEST MODE FOR CARRYING OUT THE INVENTION

Figure 1:
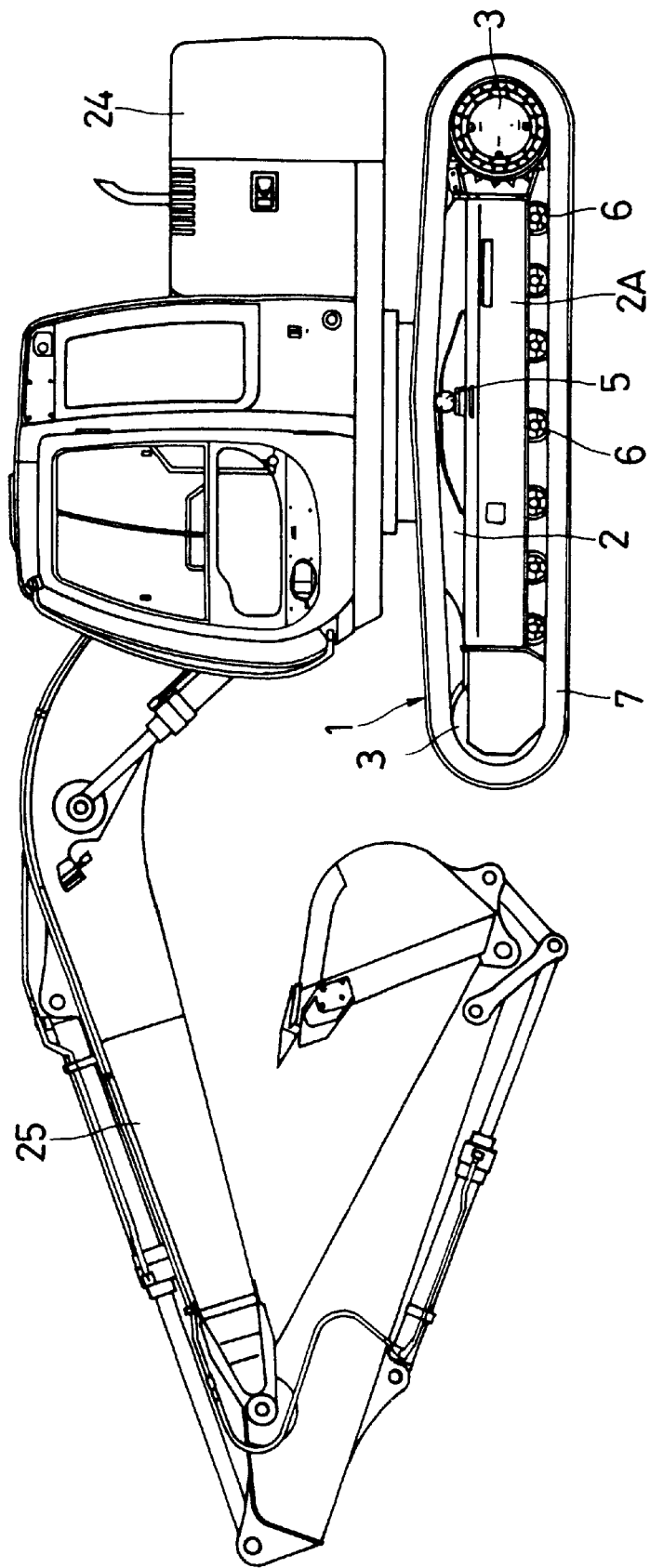
FIG. 1 is a schematic outer view of a hydraulic excavator with crawler belts adopted as a first embodiment of the present invention.
Figure 2:
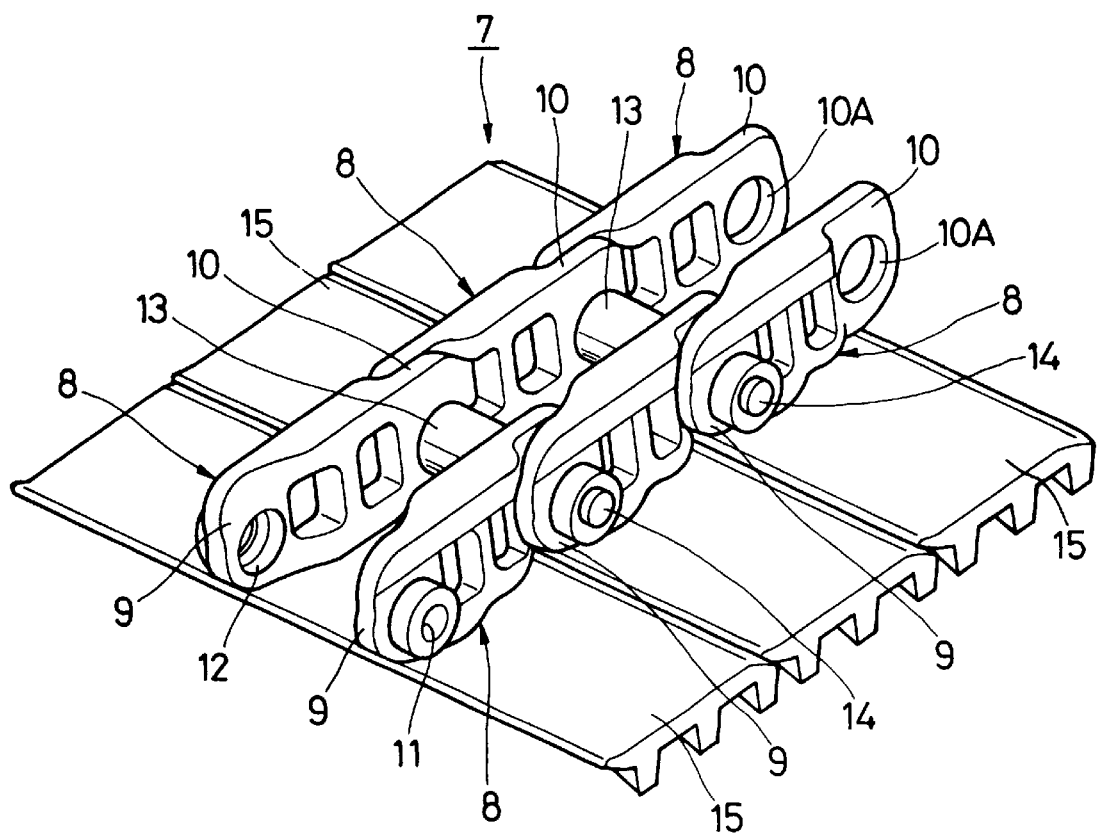
FIG. 2 is a schematic perspective view showing part of one crawler belt on an enlarged scale.

Hereafter, with reference to the accompanying drawings, the crawler belt according to the present invention is described more particularly by way of its preferred embodiments, in which the crawler belt in applied by way of example to a hydraulic excavator.

Illustrated in FIGS. 1 through 8 is a first embodiment of the present invention, in which indicated at 1 is a lower travelling body of a hydraulic excavator. The lower travelling body 1 is constituted by a truck frame 2 with right and left side frames 2A (only one side frame is shown in the drawings) which are extended toward the front and rear sides of the travelling body 1, an idle wheel 3 and a drive wheel 4 which are provided at the opposite ends of each side frame 2A, and a crawler belt 7 which is endlessly passed around the idle and drive wheels 3 and 4 as will be described hereinafter.

Further, each side frame 2A of the truck frame 2 is provided with an upper roller 5 which guides an upper run of the crawler belt 7 on the upper side of the side frame 2A, along with a plural number of lower rollers 6 which guide a lower run of the crawler belt 7 on the lower side of the side frame 2A.

The crawler belt 7, which is passed endlessly around the idle wheel 3 and drive wheel 4 as mentioned above, is constituted by track links 8, bushes 13, connecting pins 14 and shoes 15 which will be described after. The bushes 13 of the crawler belt 7, which are located in interconnecting portions between the right and left track links 8, are meshed with the drive wheel 4. In the meshed state, the crawler belt 7 is driven by the drive wheel 4 to turn around between the idle wheel 3 and the drive wheel 4.

Figure 3:
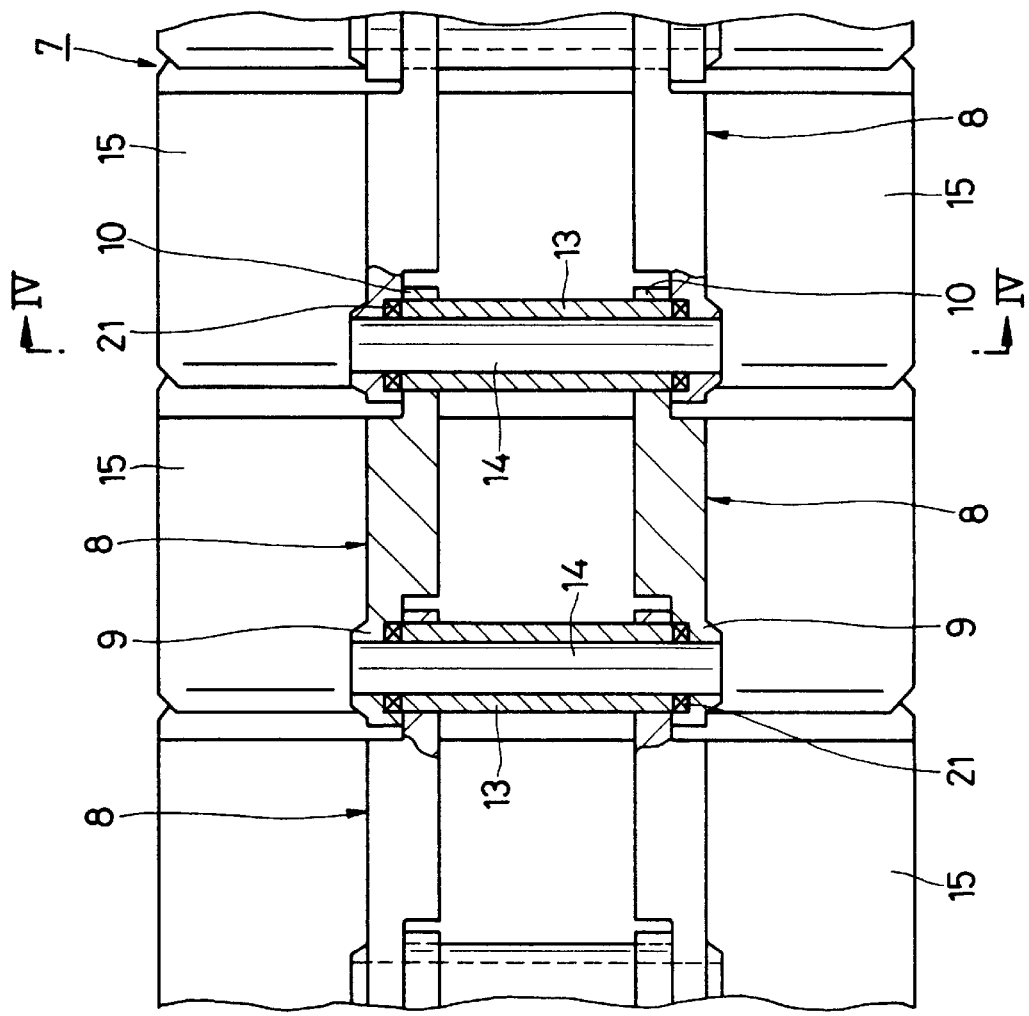
FIG. 3 is a fragmentary and partly cutaway plan view of connecting portions between two track links.

Indicated at 8 are the right and left track links which are located at and along right and left sides of the crawler belt 7 and are connected with each other in an endless form. As shown in FIG. 3, each track link 8 is extended in the longitudinal direction of the crawler belt 7. Each unit of track links 8 is formed with an outer link portion 9 at one longitudinal end and with an inner link portion 10 at the other longitudinal end. Formed in the inner link portions 10 of the respective track links 8 are holes 10A in which the bushes 13 are fitted as described hereinafter.

Figure 4:
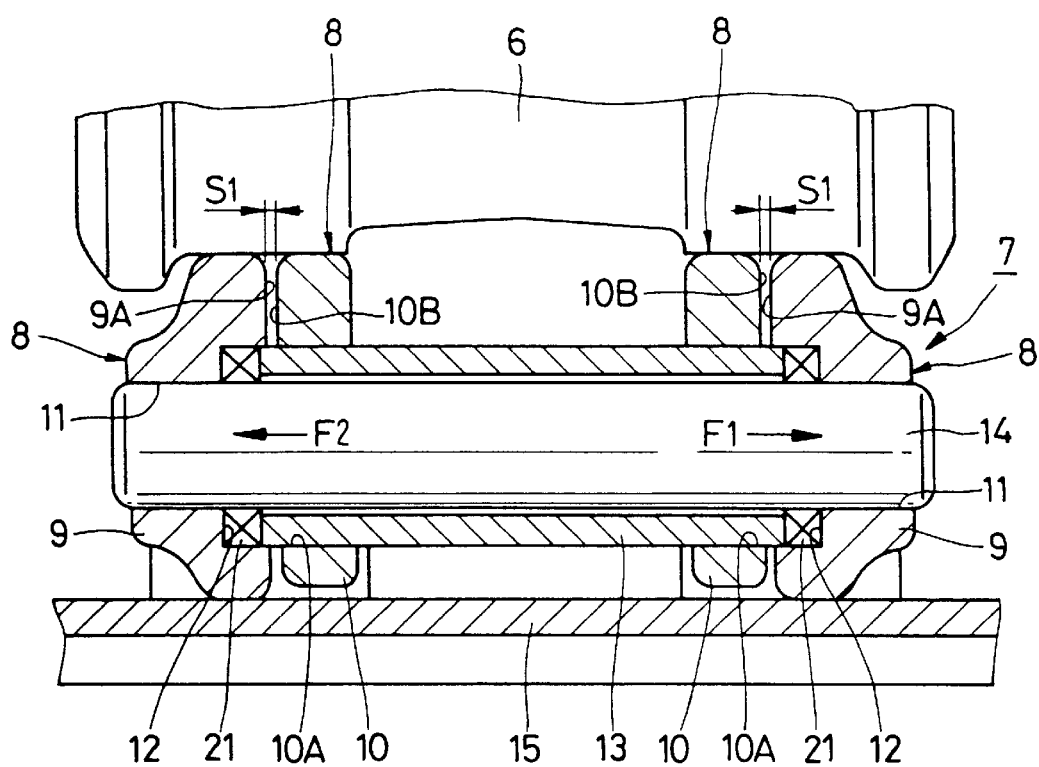
FIG. 4 is a transverse sectional view of the connecting portions between the two track links, taken in the direction of arrows IV—IV of FIG. 3.

In this instance, in an unloaded state free of loads which act in the rightward and leftward directions (hereinafter referred to as "thrust loads" for brevity), space S1 of approximately 0.5 mm to 2.0 mm, preferably of approximately 1.0 mm is formed between confronting surfaces 9A and 10B of outer and inner link portions 9 and 10 of the track link on the left side as well as between confronting surfaces 9A and 10B of outer and inner link portions 9 and 10 of the track link on the right side, as shown in FIG. 4.

On the other hand, when the track links 8 are subjected to a thrust load acting in the direction of arrow F1 in FIG. 4 (in the rightward direction), outer link portions 9 on the left side are pushed into abutting engagement against adjacent inner link portions 10 (hereinafter referred to as "an abutted state") to close up completely the gap space between the confronting faces 9A and 10B of the outer and inner link portions 9 and 10.

Conversely, when the track links 8 are subjected to a thrust load acting inversely in the direction of arrow F2 in FIG. 4 (in the leftward direction), the outer link portions 9 on the right side are pushed into abutting engagement against adjacent inner link portions 10. As a result, as shown particularly in FIG. 8, the outer link portions 9 on the left side are moved away from the inner link portions 10 to open up a gap space of maximum width therebetween (hereinafter referred to as "a maximumly spaced state"). In this instance, the maximum gap space between the confronting faces 9A and 10B is arranged to be approximately two times as large as the above-mentioned gap space S1 (2×S1).

Indicated at 11 are pin fitting holes which are bored in the outer link portions 9 of each track link 8. These pin fitting holes 11 are bored through from one to the other lateral side of the outer link portions 9, and connecting pins 14 are fitted therein by the use of a pressing-in or driving-in means.

Denoted at 12 are seal anchor holes which are provided on the outer link portions 9 of the track links 8 on the side of the faces 9A which confront the inner link portions 10. These seal anchor holes 12 are each provided with a bottom end surface 12A and an inner peripheral surface 12B, and formed in a larger diameter than and in coaxial relation with the pin fitting holes 11. The seal anchor holes 12 are also larger diameter than the bushes 13 in diameter in order to hold therein sealing devices 21 as will be described hereinafter.

Designated at 13 are the bushes which are provided between the inner link portions 10 of the respective track links 8, each one of the bushes 13 receiving a connecting pin 14 therein. The bushes 13 are each in the form of a transversely extending tube having end faces 13A at its right and left ends. The end faces 13A are each constituted by a flat surface which is disposed normal to the longitudinal axes of the bush 13. Further, the bushes 13 are press-fitted in the bush fitting holes 10A of the respective inner link portions 10, and the transversely opposite ends of the respective bushes 13 are projected into the seal anchor holes 12 and are confronted by the outer link portions 9 through a gap space.

Indicated at 14 are the connecting pins which connect transversely adjacent track links 8 with each other. These connecting pins 14 are inserted in the bushes 13 in small gap, and the transversely opposite ends of the connecting pins 14 are press-fitted in the pin fitting holes 11 in the outer link portions 9. Further, a lubricant oil such as grease or the like is filled in the gap between each connecting pin 14 and the bush 13 in order to ensure smooth relative rotations of the connecting pin 14 and the bush 13.

Indicated at 15 are shoes which are made of metal plates and attached to the respective track links 8. As shown in FIG. 4, the shoes 15 are securely fixed to the outer side of the respective track links 8 (on the outer peripheral side of the crawler belt 7) to connect the right and left track links 8 integrally with each other and to provide treading surfaces for the crawler belt 7.

Denoted at 21 are right and left sealing devices which are fitted in the seal anchor holes 12 in a laterally compressed state. More specifically, the seal members 21 are fitted on the outer peripheral side of the connecting pins 14 between the bushes 13 and outer link portions .9 of the track links 8. The sealing devices 21 are each constituted by an assembly of a seal ring 22 and a coned disc spring 23, which will be described hereinafter, and function to stop the gap space between a bush 13 and a connecting pin 14 to prevent intrusion of foreign matter such as dirt or the like and at the same time to seal the grease in the gap space.

Figure 5:
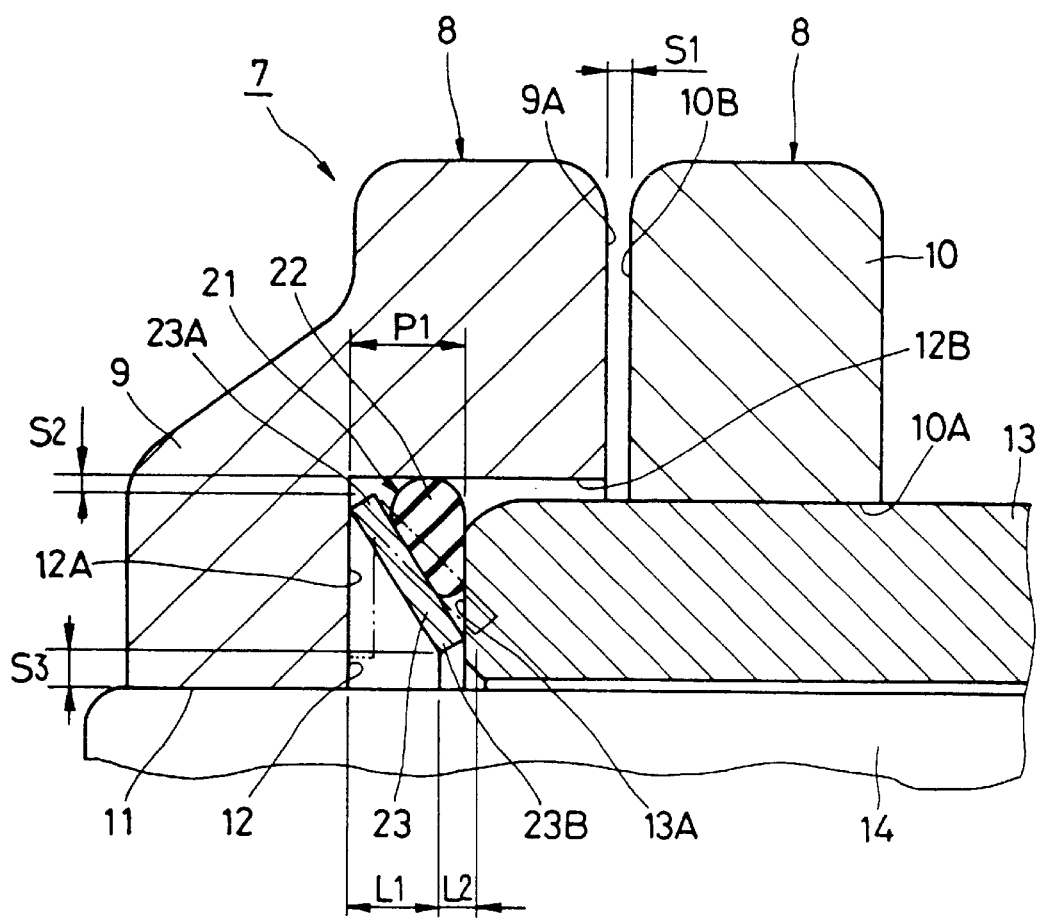
FIG. 5 is a fragmentary sectional view, showing on an enlarged scale confronting surface portions of outer and inner link portions of a track link.
Figure 6:
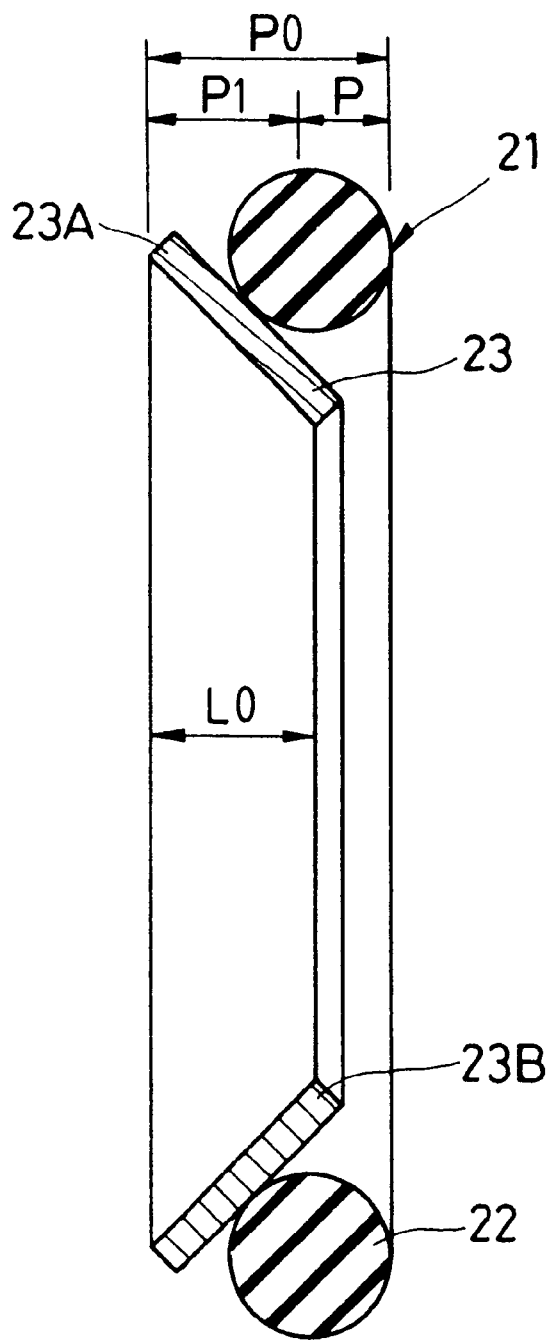
FIG. 6 is a schematic sectional view of a sealing device shown in FIG. 5, the sealing device being shown in a free-state length.

Indicated at 22 are the seal rings which are located around outer peripheries of the connecting pins 14. These seal rings 22 are each formed of a resilient resin material, for example, such as urethane rubber, nitrile rubber or the like and in the shape of an O-ring having a diameter larger than the connecting pins 14. In a free state, each seal ring 22 takes the shape as shown in FIG. 6. Further, by resilient force of the coned disc spring 23, each seal ring 22 is pressed against inner peripheral surfaces 12B of the seal anchor hole 12 and at the same time against an opposing end face 13A of a bush 13 as shown in FIG. 5, with a compressive deformation to seal up the gap space between the outer link portion 9 and the bush 13.

Denoted at 23 are the coned disc springs which are each fitted between an outer link portion 9 and a bush 13 in a compressively deformed state in the transverse direction. Each one of these coned disc spring 23 is formed of a resilient material which has a higher value in modulus of elasticity (spring constant) than the seal rings 22, for example, formed of a metallic material like spring steel in a conical shape which is reduced in diameter toward the bush 13. In a free state, the coned disc spring 23 presents a tapered shape as shown in FIG. 6.

The seal ring 22 and coned disc spring 23 are formed separately of each other in this case, and fitted into the seal anchor hole 12 in an assembled state, that is, with the coned disc spring 23 located radially on the inner side of the seal ring 22. Accordingly, at an outer peripheral end 23A which is largest in diameter, each coned disc spring 23 is resiliently abutted against bottom end surfaces 12A of the seal anchor hole 12. On the other hand, at an inner peripheral end 23B which is smallest in diameter, the coned disc spring 23 is resiliently held in sliding contact with the confronting end face 13A of the bush 13.

Thus, the coned disc spring 23 functions to press the seal ring 22 resiliently against the inner peripheral surface 12B of the seal anchor hole 12 and the end face 13A of the bush 13, and to support thrust loads which act on adjacently located outer and inner rink portions 9 and 10 of the track link 8.

In this instance, as shown in FIG. 6, the coned disc spring 23 is arranged to have a free-state length L0 in the lateral (axial) direction. Each coned disc spring 23 is deformable through a maximum flexural deformation distance L1 as it is deformed from the unloaded state of FIG. 5 to a maximally compressed state as indicated by two-dot chain line in FIG. 5 (i.e., to a position where the coned disc spring 23 comes nearest to the bottom end surface 12A of the seal anchor hole 12). The maximum flexural deformation distance L1 is in the relationship of L1>S1 with the gap width S1 between the afore-mentioned outer and inner link portions 9 and 10. More specifically, for example, the maximum flexural deformation distance L1 is set at a value approximately two to three times as large as the gap width S1 (i.e., L1=S1×2.0 to 3.0). Namely, considering in relation with the gap width S1, the value of the maximum flexural deformation distance L1 should be about 1 mm to 6 mm, preferably, about 2.5 mm.

Further, as indicated by one-dot chain line in FIG. 5, each coned disc spring 23 is arranged to have an initial flexural deformation distance L2 when compressively deformed from the free-state length indicated by one-dot chain line in FIG. 5 (see also FIG. 6) into the unloaded state indicated by solid line. This initial flexural deformation distance L2 is set in the relationship of L2>S1 relative to the above-mentioned gap width S1. More specifically, the initial flexural deformation distance L2 is set at a value approximately 1.5 to 2 times as large as the gap width S1 (S1=(L2×1.5 to 2.0). Namely, considering in relation with the gap width S1, the value of the initial flexural deformation distance L2 should be about 0.7 mm to 4 mm, more preferably, about 1.5 mm.

On the other hand, as shown in FIG. 6, the sealing device 21 has an axial free-state length P0 including the seal ring 22 and the coned disc spring 23. Therefore, an initial flexural deformation distance, a change in length from the free-state length of FIG. 6 to the length in unloaded state shown in FIG. 5, corresponds to a total initial flexural deformation length P of the seal ring 22 and the coned disc spring 23, which can be expressed as P=P0−P1 (where P1 is the gap width between the seal anchor hole 12 and the bush 13).

The sealing device is arranged to have an initial flexural deformation length P in the relationship of P>S1 relative to the gap width S1, more specifically, an initial flexural deformation distance of approximately 3.5 mm to 4.5 mm, preferably of about 4.0 mm.

Further, as shown in FIG. 5, the coned disc spring 23 is arranged in such a way as to have a gap of a width S2 radially between its outer peripheral end 23A and the seal anchor hole 12, and to have a gap of a width S3 radially between its inner peripheral end 23B and the connecting pin 14, in the relationship of S2<S3.

Indicated at 24 is an upper rotary body of the hydraulic excavator which is rotatably mounted on the lower travelling body 1, and at 25 is a working mechanism which is provided on a front portion of the upper rotary body 24 and liftable up and down in the vertical direction.

With the arrangements as described above, the hydraulic excavator according to the present embodiment can be put in travel in a forward or reverse direction on and along a road by driving the drive wheels 4 from a vehicular drive motor (not shown), turning the crawler belts 7 between and around the idle and drive wheels 3 and 4 in the forward or reverse direction.

While the crawler belts 7 are turned around for a traveling operation, the gap spaces between the outer link portions 9 of the track links 8 and the bushes 13 are sealed by the sealing devices 21 to shield off dirt or other foreign matter which may otherwise intrude into the gap spaces between the respective bushes 13 and connecting pins 14 and at the same time to prevent leakage of grease which is filled in the gap spaces.

In this regard, according to the present embodiment, the seal ring 22 and coned disc spring 23 of each sealing device 21 are assembled into the seal anchor hole 12 together in such a way that the seal ring 22 is resiliently pressed against the bottom end surface 12A of the seal anchor hole 12 and the end face 13A of the bush 13 by the action of the coned disc spring 23. In addition, under compressively deformed conditions, the coned disc spring 23 is deformable through the maximum flexural deformation distance L1 which is larger than the width S1 of the gap space between the outer and inner link portions 9 and 10.

Figure 7:
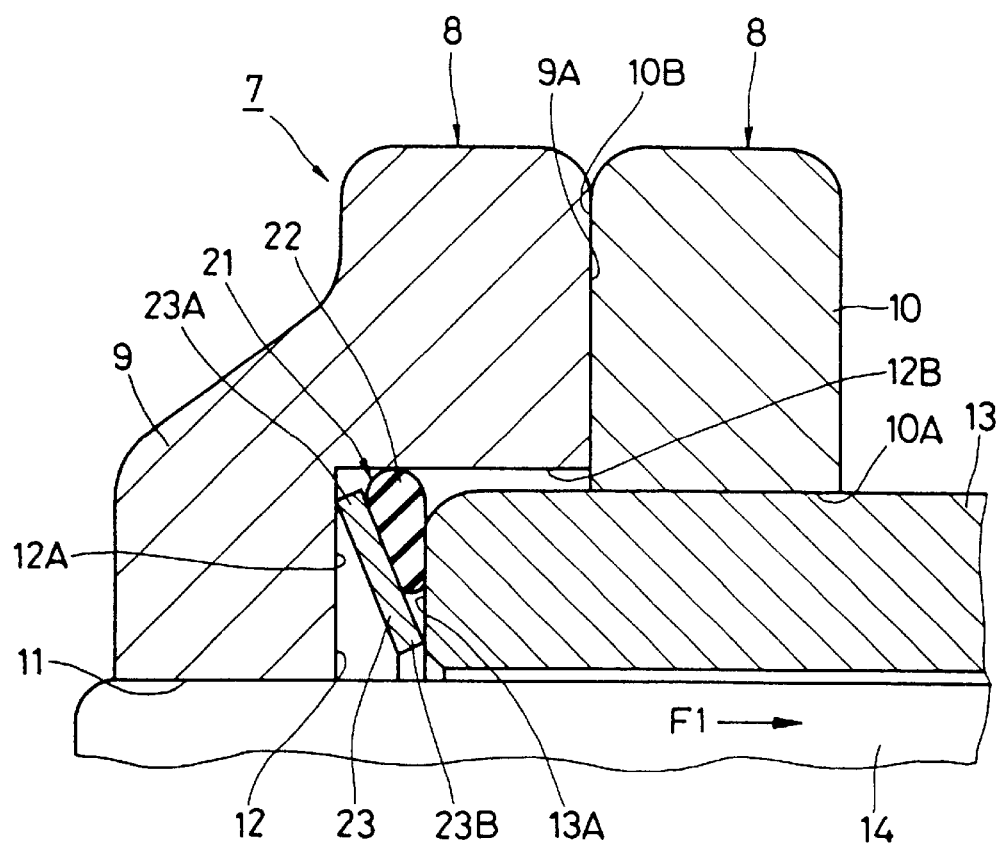
FIG. 7 is a sectional view similar to FIG. 5, showing the outer and inner link portions which are brought into abutting engagement with each other.

As a consequence, even if the outer and inner link portions 9 and 10 which are in adjacent positions are brought into abutting engagement against with each other as shown in FIG. 7 by thrust load acting on the track links 8 in the direction of arrow F1 in FIG. 4 while the crawler belt 7 is put in turning movement, the compressive displacement of each coned disc spring 23 can be suppressed to an amount smaller than the maximum flexural deformation distance L1. Since coned disc spring 23 does not undergo resilient deformation any longer toward the position of maximum compression as indicated by two-dot chain line in FIG. 5, it can retain excellent resiliency over a long period of time.

Figure 8:
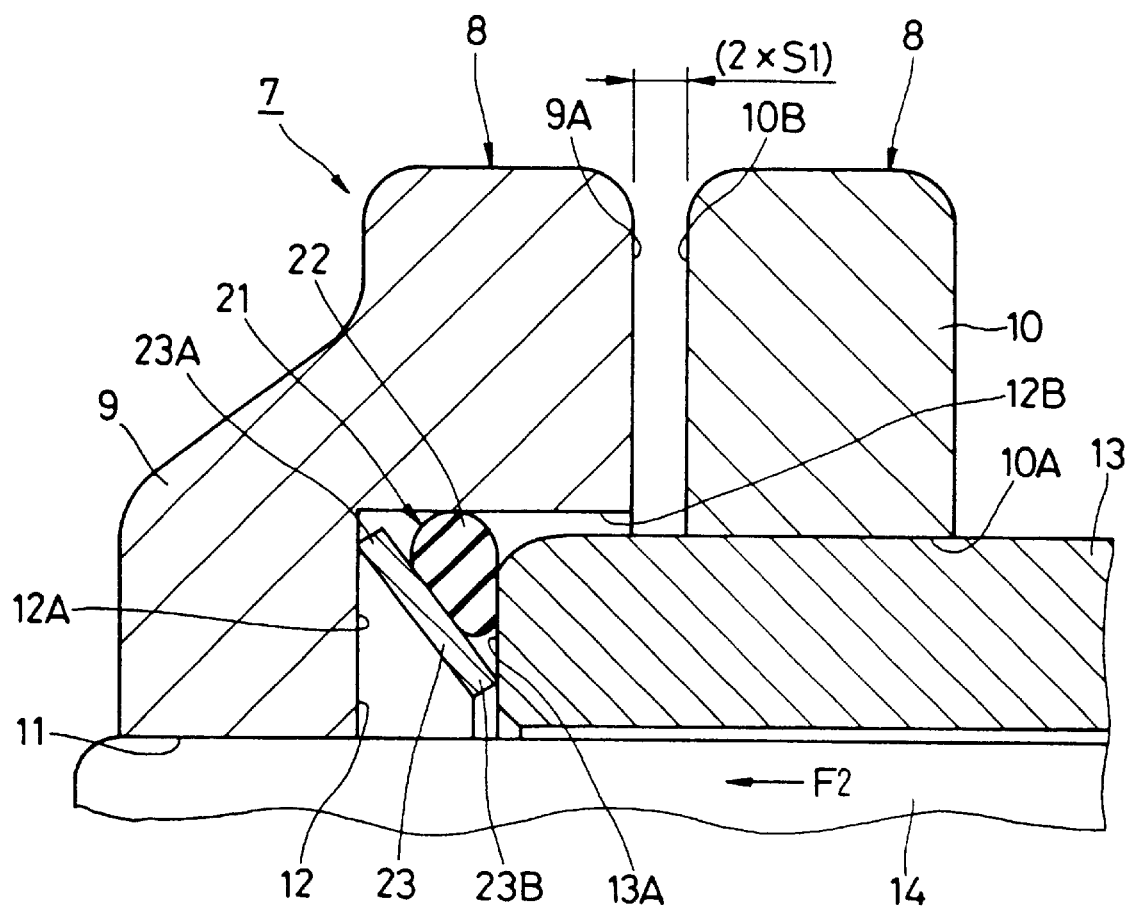
FIG. 8 is a sectional view similar to FIG. 5, showing the outer and inner link portions which are spaced away from each other to a maximum degree.

Further, the coned disc spring 23 is arranged to have an initial flexural deformation distance L2 which is larger than the gap width S1 between the outer and inner link portions 9 and 10, so that, even if the outer and inner link portions 9 and 10 are set apart to the maximally spaced positions shown in FIG. 8 as a result of exertion of thrust load acting on the track links 8 in the direction of arrow F2 in FIG. 4, the coned disc spring 23 can still retain an ability of resilient deformation between the bottom end surface 12A of the seal anchor hole 12 and the end face 13A of the bush 13. Therefore, by the resilient spring force of the coned disc spring 23, the seal ring 22 is pressed against the inner peripheral wall surface 12B of the seal anchor hole 12 and the end face 13A of the bush 13.

Further, the sealing device 21 as a whole is arranged to have a margin of initial flexural deformation length P (P=P0−P1) which is larger than the width S1 of the gap space between the outer and inner link portions 9 and 10. Therefore, when the outer and inner link portions 9 and 10 are set apart to maximally spaced positions, the coned disc spring 23 can still be retained in a resiliently deformable state between the bottom end surface 12A of the seal anchor hole 12 and the end face 13A of the bush 13.

Thus, according to the arrangements of the present embodiment, a resilient spring force is applied on the seal ring 22 by the coned disc spring 23 constantly in a stabilized state even if the outer and inner link portions 9 and 10 are in abutting engagement with each other or separated to maximally spaced positions, thereby sealing the gap space between the outer and inner link portions 9 and 10 tightly through surface contact with the seal ring 22.

In addition, the outer and inner peripheral end portions 23A and 23B of each coned disc spring 23 are resiliently abutted against the bottom end surface 12A of the seal anchor hole 12 and the end face 13A of the bush 13, respectively, so that, when thrust load is exerted on the track links 8 as mentioned hereinbefore, the coned disc spring 23 acts to support the exerted thrust load to reduce its transmission to the seal ring 22.

Therefore, even if where the surface pressure of the seal ring 22, which is in sliding contact with the end face 13A of the bush 13, is set at a relatively high level, it becomes possible to prevent fatigue and deformation of the seal ring 22 as caused by the coned disc spring 23 in the case of the prior art mentioned hereinbefore, and to enhance the sealing capacity of the seal ring 22 all the more by reducing its abrasive wear and damages as would otherwise result from frictional contact with the bush 13. Resides, while the crawler belt 7 is turned around, the coned disc spring 23 serves to stabilize the movements of the crawler belt by applying resistance relative sliding movements of the outer link portion 9 and bush 13 in a suitable degree for preventing flapping movements of the crawler belt 7 as explained hereinbefore in connection with the prior art.

Further, the outer peripheral end 23A of the coned disc spring 23 is abutted against the bottom end surface 12A of the seal anchor hole 12 while its inner peripheral end 23B is held in sliding contact with the end face 13A of the bush 13. Therefore, the coned disc spring 23 can be set in position in a tapered shape converging toward the bush 13.

It follows that the coned disc spring 23 can strongly push the seal ring 22 toward the outer link portion 9 and at the same time toward the end face 13A of the bush 13 to form therebetween a tight seal, which can shield off rain water or muddy water which might otherwise creep in toward the coned disc spring 23 and lend itself to development of rust on the coned disc spring 23. Thus, the coned disc spring 23 can retain its resiliency over a prolonged period of time.

Moreover, the coned disc spring 23 is so located as to leave between its inner peripheral end 23B and the connecting pin 14 the gap space S3 which is wider than the gap space S2 between its outer peripheral end 23A and the seal anchor hole 12. Therefore, the connecting pin 14 and the inner end 23B of the coned disc spring 23 can be kept out of contact with each other. Consequently, even if the bush 13 and coned disc spring 23 are rotated together when the track links 8 are turned around by rotation of the crawler belt 7, the inner peripheral end 23B of the coned disc spring 23 can be prevented from getting into sliding contact with circumferential surfaces of the connecting pin 14. This arrangement contributes to prevent abrasive wear of and damages to the connecting pin 14.

On the other hand, the seal ring 22 and the coned disc spring 23 are formed separately from each other. Therefore, at the time of parts replacement of the sealing devices 21, the seal rings 22 and coned disc springs 23 can be replaced individually and independently of each other, thereby permitting considerable reductions in part replacement cost as compared a case where the seal ring 22 and the coned disc spring 23 are formed into one integral structure.

Further, the opposite end faces 13A of each bush 13 are in the form of normal flat surfaces which are simple in shape and can be formed easily and efficiently by simple machining operations.

Figure 9:
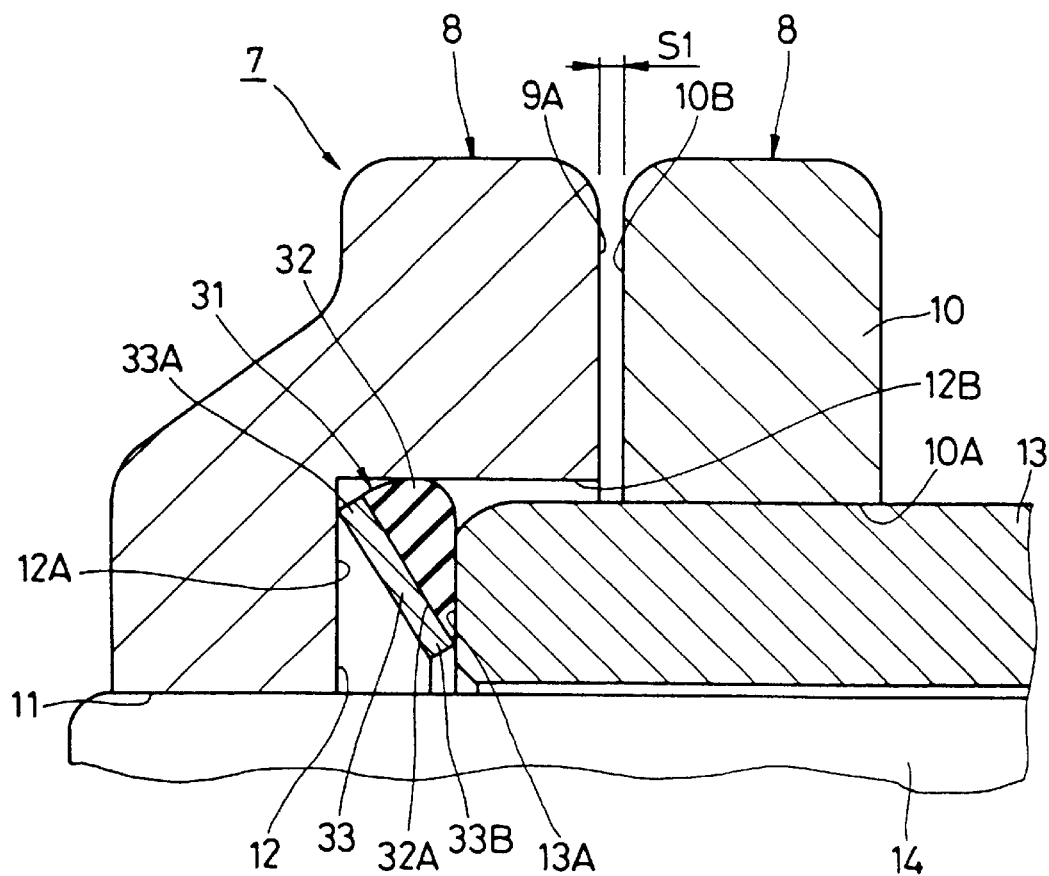
FIG. 9 is a fragmentary sectional view, showing on an enlarged scale confronting surface portions of outer and inner link portions of a track link employed in a second embodiment of the present invention.
Figure 10:
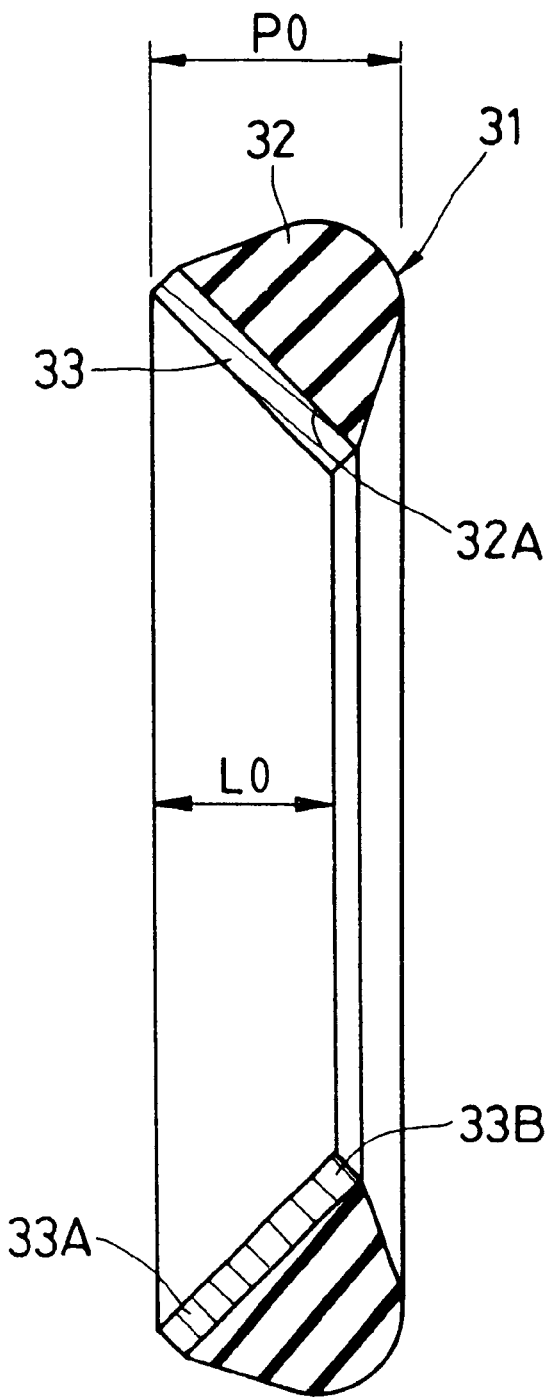
FIG. 10 is a schematic sectional view of a sealing device shown in FIG. 9, the sealing device being shown in a free-state length.

Shown in FIGS. 9 and 10 is a second embodiment of the present invention, in which the component parts common with the foregoing first embodiment are designated by common reference numerals or characters to avoid repetitions of same explanations. In place of the composite sealing device 21 of the first embodiment, the second embodiment employs a sealing device 31 which have a seal ring 32 and a coned disc spring 33 formed into an integral structure.

In this instance, similarly to the seal ring 22 in the first embodiment, the seal ring 32 is formed in a ring-like shape by the use of a resilient synthetic resin material. In a free state, the seal ring 32 is approximately triangular or trapezoidal in sectional shape as shown in FIG. 10. In the same way as the coned disc spring 33, the seal ring 22 is provided with a tapered surface 32A on the inner peripheral side converging toward the bush 13.

Further, the coned disc spring 33 is formed in the shape as the coned disc spring 23 described in the first embodiment, including an outer peripheral end 33A and an inner peripheral end 33B. The outer periphery of the coned disc spring 33 is securely fixed to the tapered surface 32A of the seal ring 32.

The present embodiment, with the arrangements just described, can produce substantially the same operational effects as the foregoing first embodiment. Especially, in the case of the present embodiment employing the sealing device 31 which each have the seal ring 32 and the coned disc spring 33 formed into one integral structure, it becomes possible to set the seal ring 32 and the coned disc spring 33 in position within the seal anchor hole 12 at once simply by assembling the sealing device 31 into the seal anchor hole 12. This arrangement contributes to enhance the efficiency of an assembling stage since there is no need for assembling the seal ring and coned disc spring separately into the seal anchor hole as in the foregoing first embodiment.

Referring now to FIGS. 11 through 14, there is shown a third embodiment of the present invention, which is characterized in that, on an end face on the side of the sealing device, each bush is provided with a seal ring abutting surface which is projected axially outward of a coned disc spring abutting surface, and an annular stepped portion is provided between the seal ring abutting surface and the coned disc spring abutting surface.

In the following description of the third embodiment, those component parts which are common with the foregoing first embodiment are designated by common reference numerals or characters to avoid repetitions of same explanations.

In the drawings, indicated at 41 are bushes which are used in the present embodiment and which are located between the inner link portions 9 of the track links 8. Similarly to the bush 13 in the first embodiment, each one of the bush 41 is formed in a tubular shape and provided with end faces 42 at axially opposite ends thereof (one end face alone is shown in the drawings).

In this instance, each end face 42 of the bush 41 includes a seal ring abutting surface 42A which is provided annularly on an outer side of a radially halfway point of the end face 42 for abutting engagement with a seal ring 52 which will be described hereinafter, and a coned disc spring abutting surface 42B which is provided on the inner side of and projected radially outward of the seal abutting surface 42A for abutting engagement with a coned disc spring 53 which will also be described after.

The sel ring abutting surface 42A and coned disc spring abutting surface 42B on the end face 42 of the bush 41 are each formed as a flat annular surface which is disposed normal to the axis of the bush 41, and are intervened by an annular stepped wall portion 43 which extends in the axial direction of the bush.

Indicated at 51 is a sealing device according to the present embodiment. The sealing device 51 is interposed between the outer link portion 9 and bush 41, and set in the seal anchor hole 12. Substantially in the same way as the sealing devices 21 of the first embodiment, the sealing devices 51 are each constituted by seal ring 52 and coned disc spring 53 as will be described below.

Denoted at 52 is the seal ring which is provided on the outer peripheral side of the connecting pin 14. Also in the same way as the seal ring 22 of the first embodiment, this seal ring 52 is formed of a resilient synthetic resin material and in the shape of an O-ring which is larger than the connecting pin 14 in diameter, presenting a shape as shown in FIG. 12 in a free state.

In this instance, the seal ring 52 is interposed between the inner peripheral surface 12B of the seal anchor hole 12 and the seal ring abutting surface 42A of the bush 41, and fitted on the annular stepped wall portion 43 on its inner peripheral side. By resilient spring force of the coned disc spring 53, the seal ring 52 is abutted against the inner peripheral surface 12B and the seal ring abutting surface 42A, sealing the gap space between the outer link portion 9 and the bush 41 with a margin of further compressive deformation.

Indicated at 53 is the coned disc spring which is interposed between the outer link portion 9 and the bush 41, in a compressed state in transverse direction. Similarly to the coned disc spring 23 of the first embodiment, the coned disc spring 53 is formed of a metallic material which has a higher value in modulus elasticity (spring constant) than the seal ring 52, and provided with outer and inner peripheral ends 53A and 53B.

Figure 12:
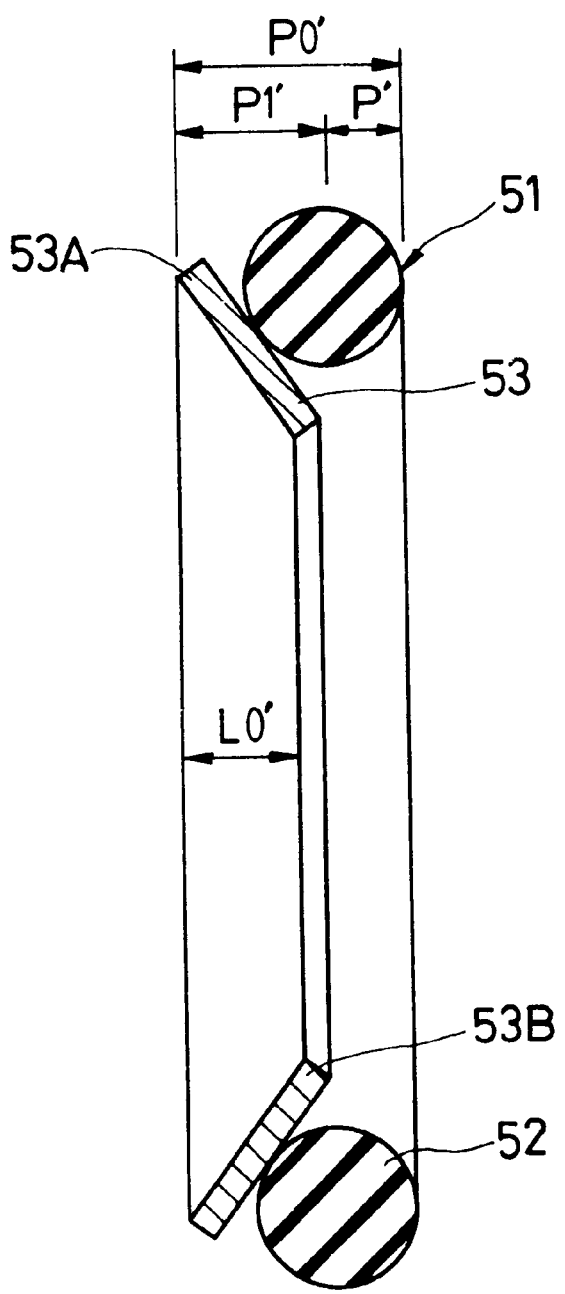
FIG. 12 is a schematic sectional view of a sealing device shown in FIG. 11, the sealing device being shown in a free-state length.
Figure 13:
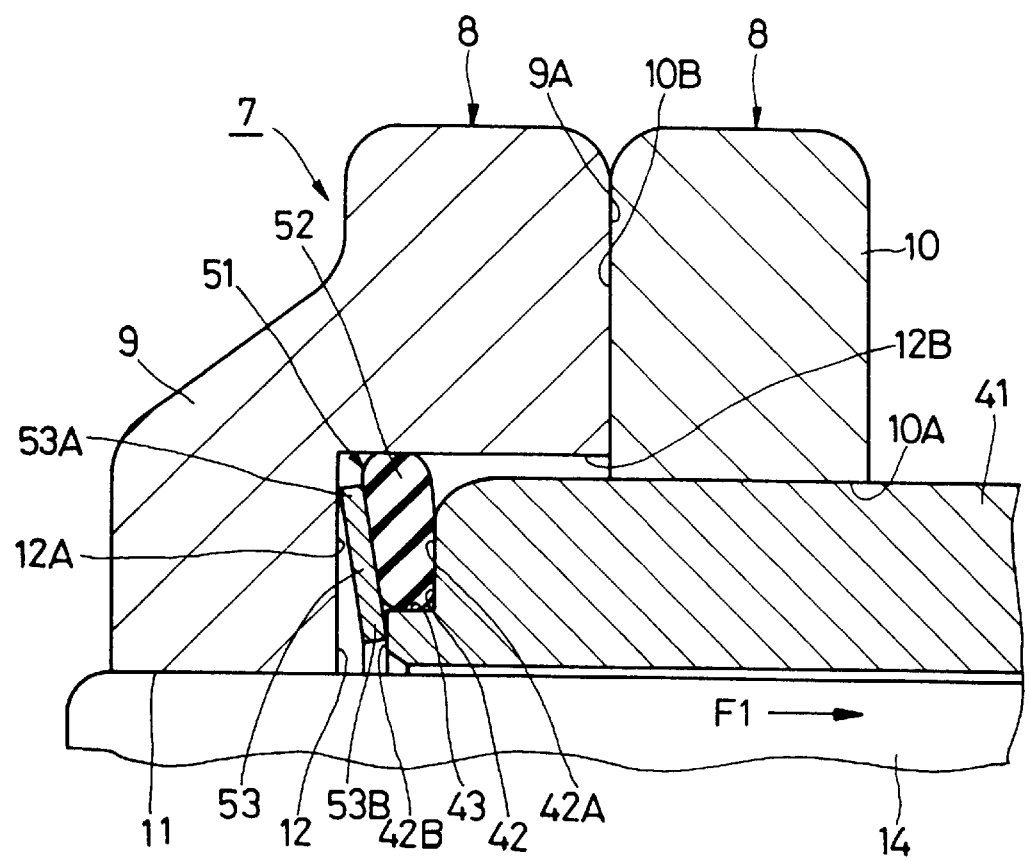
FIG. 13 is sectional view similar to FIG. 11, showing the outer and inner link portion which are brought into abutting engagement with each other.
Figure 14:
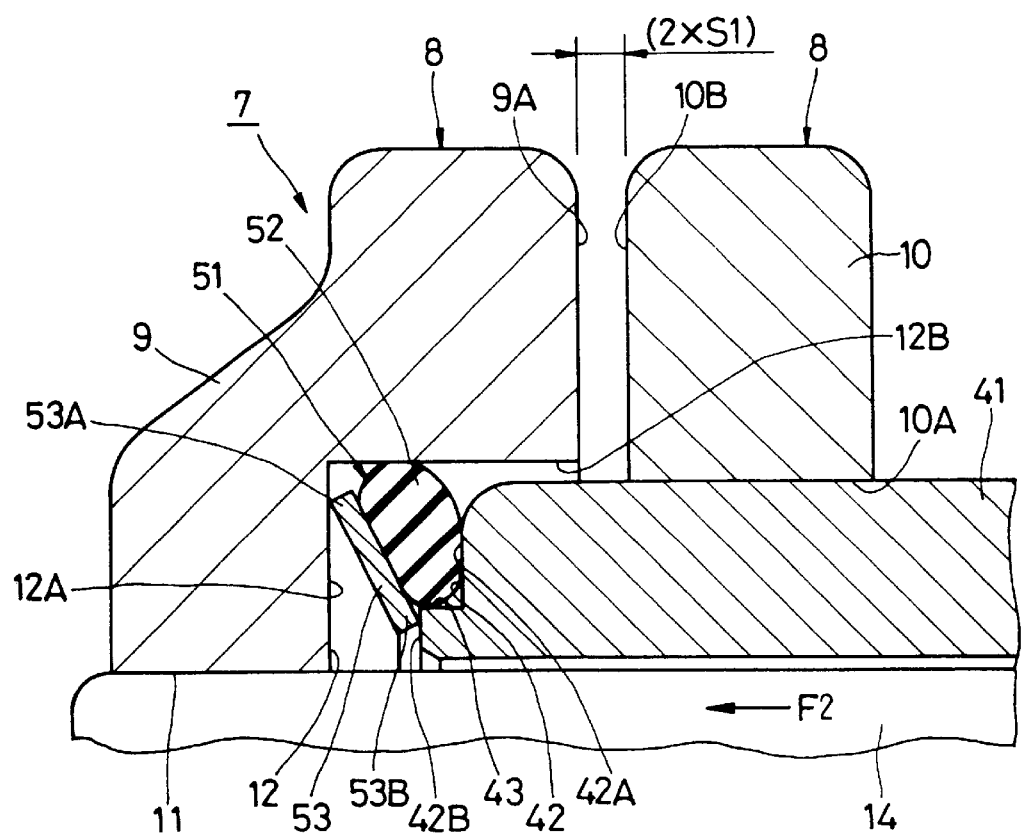
FIG. 14 is a sectional view similar to FIG. 11, showing the outer and inner link portions which are spaced away from each other to a maximum degree.

Further, in a free state, the coned disc spring 53 is formed in a shape as shown in FIG. 12, having a shorter natural length L0' in the axial direction as compared with the natural length L0 of the coned disc spring 23 in the first embodiment. The coned disc spring 53 is abutted against the bottom end surface 12A of the seal anchor hole at its outer peripheral end 53A and resiliently abutted against the coned disc spring abutting surface 42B of the bush 41 at its inner peripheral end 53B.

Figure 11:
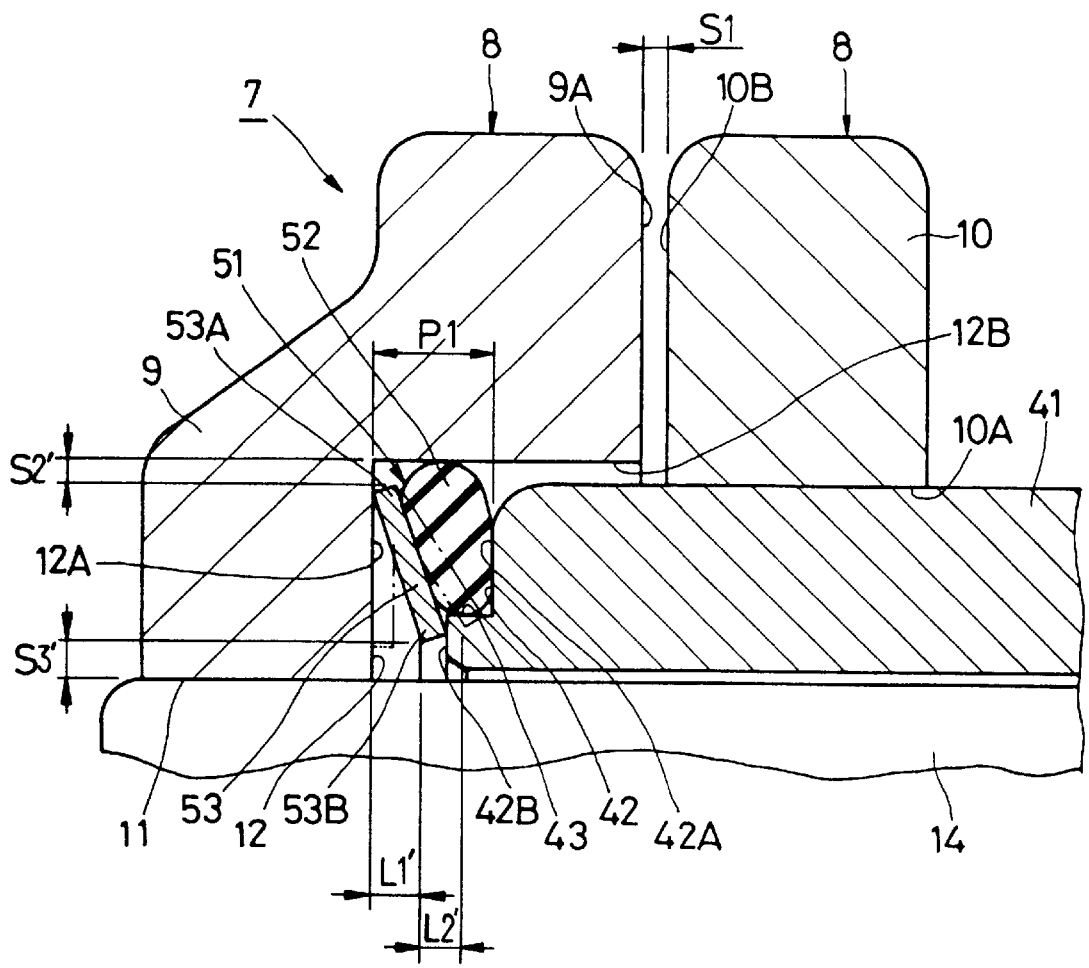
FIG. 11 is a fragmentary sectional view, showing on an enlarged scale confronting surface portions of outer and inner link portions of a track link used in a third embodiment of the present invention.

Furthermore, similarly to the coned disc spring 23 of the first embodiment, the coned disc spring 53 is compressible from an unloaded state or position shown in FIG. 11 to a maximally compressed position indicated by two-dot chain line in the same figure, through a maximum flexural deformation distance L1' which is larger than the width S1 of the gap space between the outer and inner link portions 9 and 10, namely, in the relationship of L1'>S1.

Further, from the free-state position (FIG. 12) indicated by a one-dot chain line in FIG. 11, the coned disc spring 53 is compressible to an unloaded state position indicated by a solid line in FIG. 11, by compression through an initial flexural deformation distance L2' which is also in the relationship of L2'>S1 relative to the above-mentioned gap space S1.

On the other hand, as shown in FIG. 12, the sealing device 51, including the seal ring 52 and coned disc spring 53, has a free-state length P0' in the transverse direction. From the free-state length shown in FIG. 12, the sealing device 51 is resiliently deformable into an unloaded state shown in FIG. 11, by compressive deformation through an initial flexural deformation length of distance P' which is expressed as P'=P0'−P1 and in the relationship of P'>S1 relative to the above-mentioned gap width S1.

Further, as shown in FIG. 11, the coned disc spring 53 has its outer peripheral end 53A radially spaced from the seal anchor hole 12 by a gap of a width S2' and its inner periphral end 53B radially spaced from the connecting pin 14 by a gap of a width S3', respectively, which are in the relationship of S2'<S3'.

According to the present embodiment, with the arrangements just described, the end face 42 of the bush 41 is provided with the coned disc spring abutting surface 42B which is projected axially outward of the seal ring abutting surface 42A toward the bottom end face 12A of the seal anchor hole 12, so that the gap width between the coned disc spring abutting surface 42B and the bottom end face 12A of the seal anchor hole 12 can be narrowed in proportion to the axial projection length of the coned disc spring abutting surface 42B.

Therefore, in this case, the coned disc spring 53 which has a smaller natural or free-state length L0' than the coned disc spring 23 in the first embodiment can be interposed in a pre-compressed state between the end face 42 of the bush 41 and the bottom end face 12A of the seal anchor hole 12.

This means that, no matter whether the outer and inner link portions 9 and 10 of the track links 8 are in abutting engagement with each other or moved away from each other to maximally spaced positions, the seal ring 52 can be more stably pressed against the end face 42 of the bush 41 and the inner peripheral surface 12B of the seal anchor hole 12 by resilient force of the coned disc spring 23 to seal up the gap space between these parts in good conditions, producing substantially the same operational effects as in the above-described first embodiment.

Further, in the case of the coned disc spring 53 with a smaller natural length L0', for example, it becomes possible to make the maximum flexural deformation distance L1' smaller for the purpose of prolonging the durability and service life of the coned disc spring 53 which are important from the standpoint of reliability of the sealing device 51.

Further, since the seal ring abutting surface 42A of the bush 41 is more spaced from the bottom end surface 12A of the seal anchor hole 12 than the coned disc spring abutting surface 42B in the transverse direction, it is possible to secure a space for accommodating the seal ring 52 between the seal anchor hole 12 and the coned disc spring abutting surface 42B in a manner similar to the first embodiment, permitting to assemble the seal ring 52 smoothly into position. Besides, being free from the possibility of undergoing compressive deformation to an excessive degree under the action of the coned disc spring 53, the seal ring 52 can enjoy improved durability and prolonged service life.

Furthermore, the seal ring 52 which is fitted on the annular stepped wall portion 43 of the bush 41 in this embodiment can be set in a predetermined radial position by way of the stepped wall portion 43 and can be assembled with the bush 41 in an extremely facilitated manner.

Figure 15:
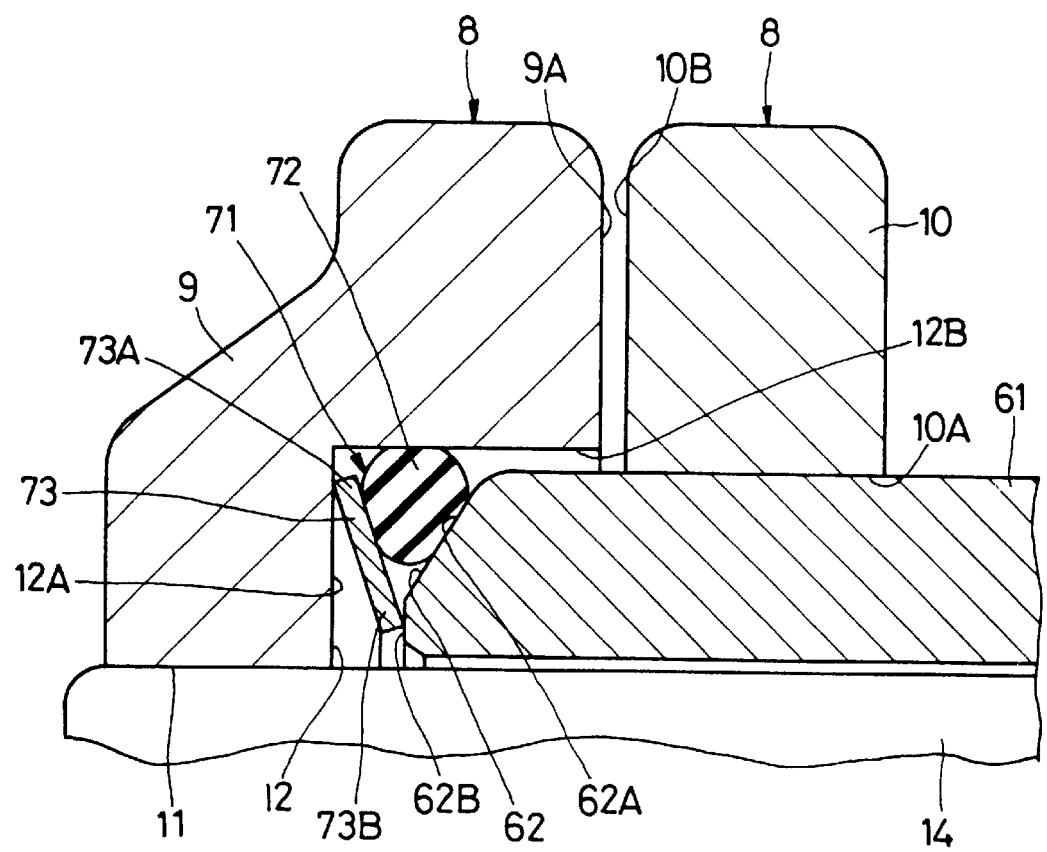
FIG. 15 is a fragmentary sectional view, showing on an enlarged scale confronting surface portions of outer and inner link portions of a track link employed in a fourth embodiment of the present invention.

Now, turning to FIG. 15, there is shown a fourth embodiment according to the present invention, which has a feature in that the end face of the bush is provided with a seal ring abutting surface of a conical shape having a gradually reduced diameter toward a coned disc spring abutting surface. In the following description of the fourth embodiment, those component parts which are common with the foregoing first embodiment are designated by common reference numerals or characters to avoid repetitions of same explanations.

In that figure, indicated at 61 is a bush which is employed in the present embodiment. Substantially in the same manner as the bush 13 in the first embodiment, the bush 61 is formed in a tubular shape and provided with end faces 62 (only one of which is shown in the drawing) at the opposite ends which are disposed in the transverse direction.

In this instance, each end face 62 of the bush 61 is formed in the shape of a truncated cone including a seal ring abutting surface 62A which is provided in a radially outer portion, and a coned disc spring abutting surface 62B which is provided radially on the inner side of the seal ring abutting surface 62A and projected axially outward.

The seal ring abutting surface 62A is constituted by a conical surface (a tapered surface) converging axially toward the coned disc spring abutting surface 62B, while the coned disc spring abutting surface 62B is constituted by a flat annular surface which is disposed normal to the axis of the connecting pin 14.

Indicated at 71 is a sealing device which is employed in the present embodiment. Substantially in the same manner as the sealing device 21 in the first embodiment, the sealing device 71 is constituted by a seal ring 72 and a coned disc spring 73 which will be described hereinafter.

Indicated at 72 is the seal ring which is formed of a resilient synthetic resin material and in the shape of an O-ring with a diameter larger than the connecting pin 14, similarly to the seal ring 22 in the first embodiment.

In this instance, the seal ring 72 is interposed between inner peripheral surface 12B of the seal anchor hole 12 and seal ring abutting surface 62A of the bush 61. More specifically, the seal ring 72 is fitted on the tapered seal ring abutting surface 62A, and pressed against the inner peripheral surface 12B of the seal anchor hole 12 and seal ring abutting surface 62A by the resilient force of the coned disc spring 73, sealing up the gap space between the outer link portion 9 and bush 61 with a margin of further compressive deformation.

Designated at 73 is the coned disc spring which is interposed between the outer link portion 9 and bush 61 in a compressively deformed state in the transverse direction. The coned disc spring 73 of this third embodiment is also arranged similarly to the coned disc spring 53 of the third embodiment, and has a smaller natural length as compared with the coned disc spring 23 of the first embodiment. The coned disc spring 73 is resiliently abutted against the bottom end surface 12A of the seal anchor hole 12 and the coned disc spring abutting surface 62B of the bush 61 at its outer and inner peripheral ends 73A and 73B, respectively.

In the case of the present embodiment, with the arrangements just described, the coned disc spring abutting surface 62B on the end face 62 of the bush 61 similarly projected axially outward of the seal ring abutting surface 62A. Therefore, the coned disc spring 73 can be assembled in a compressively deformed state between the bottom end surface 12A of the seal anchor hole 12 and the coned disc spring abutting surface 62B of the bush 61. Besides, it is possible to secure a space for accommodating the seal ring 72 between the inner peripheral surface 12B of the seal anchor hole 12 and the seal ring abutting surface 62A, free of possibilities of the seal ring 72 being compressed and deformed to an excessive degree by the coned disc spring 73, for producing substantially the same operational effects as in the third embodiment.

Since the seal ring abutting surface 62A on the bush 61 is conical in shape, it can be machined in a facilitated manner, not to mention the coned disc spring abutting surface 62B. As the seal ring abutting surface 62A of the bush 61 is tapered toward the inner periphery of the seal ring 72, the seal ring abutting surface 62A can be used in determining the position of the seal ring 72 in the radial direction and contribute to the assembling work of the seal ring 72.

Figure 16:
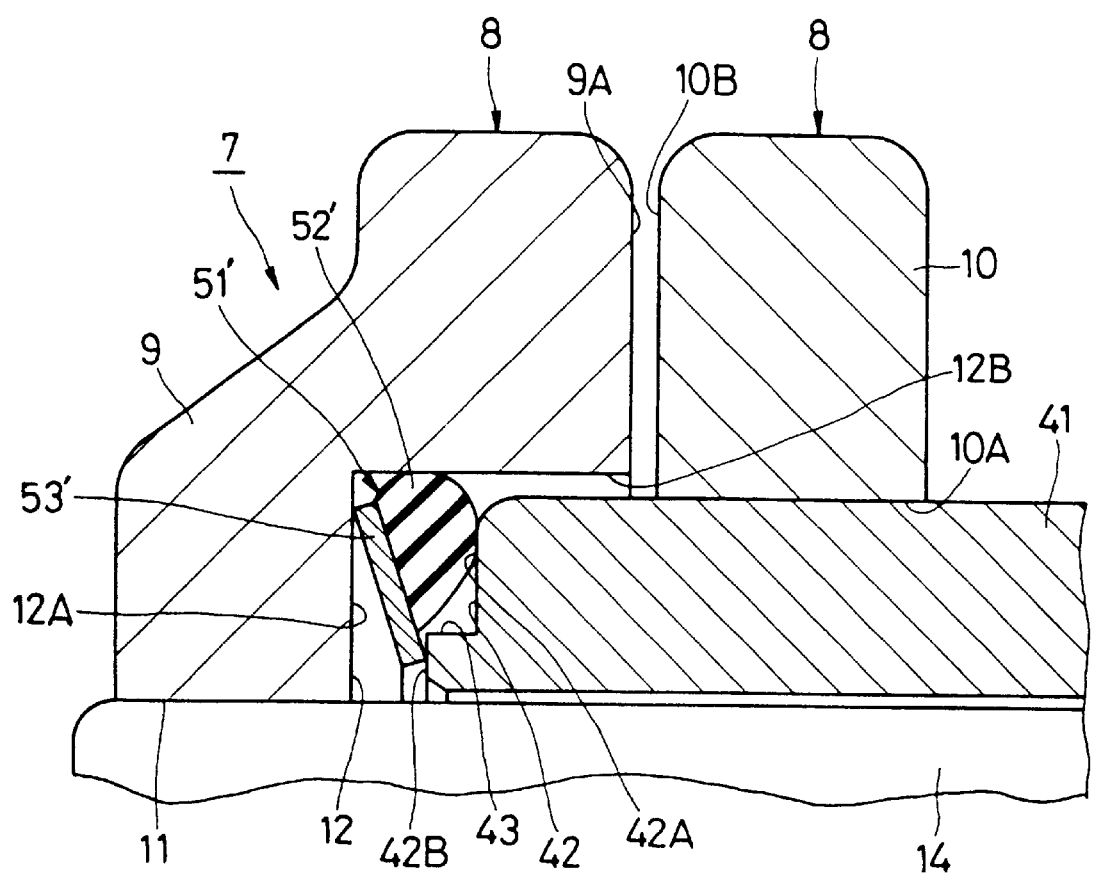
FIG. 16 is a fragmentary sectional view, showing on an enlarged scale confronting surface portions of outer and inner link portions of a track link employed in a modification of the third embodiment according to the present invention.

In the third embodiment, the sealing device 51 employs the seal ring 52 and coned disc spring 53 which are formed separately from each other. In place of the sealing device 51, however, there may be employed a sealing device 51' of a modified construction, for example, as shown in FIG. 16. The sealing device 51' is constituted by a seal ring 52' and a coned disc spring 53' which are formed into an integral structure in the same manner as in the second embodiment.

In this case, assembling work for the sealing device 51' can be facilitated to a significant degree because there is no necessity for assembling the seal ring 52' and the coned disc spring 53' separately into the seal anchor hole 12 in an assembling stage.

Figure 17:
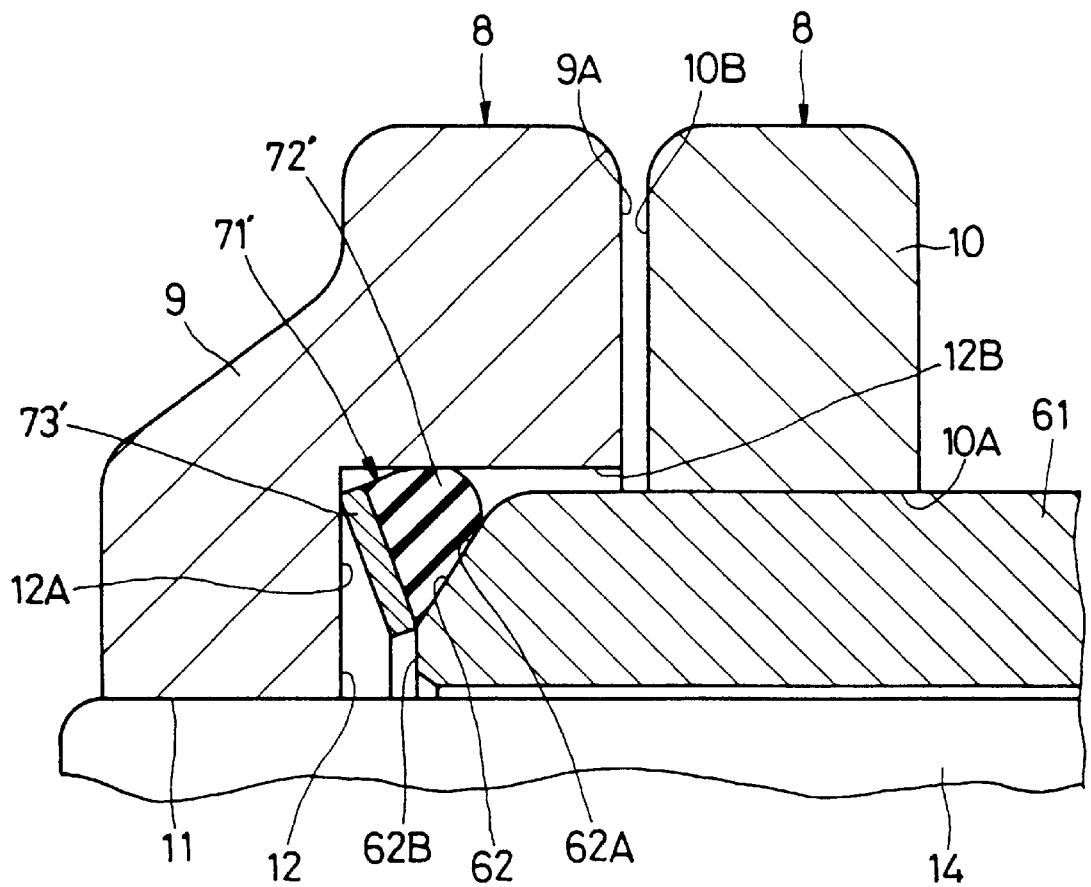
FIG. 17 is a fragmentary sectional view, showing on an enlarged scale confronting surface portions of outer and inner link portions of a track link employed in a modification of the fourth embodiment of the present invention.

Further, in the case of the fourth embodiment described above, each sealing device 71 employs the seal ring 72 and coned disc spring 73 which are formed separately of each other. However, if desired, the sealing device 71 may be modified as shown in FIG. 17. Namely, in the case of this modification, a sealing device 71' is constituted by a seal ring 72' and a coned disc spring 73' which are formed into one integral structure.

Furthermore, in the case of the second embodiment described above, each sealing device 31 employs the seal ring 32 and the coned disc spring 33 which are formed into one integral structure. Alternatively, for example, the coned disc spring 33 may be fixed to the seal ring 32 by baking or bonding or other fixation means if desired. The same applies to the above-describe modified sealing devices 51' and 71'.

Further, although the respective embodiment of the present invention have been described by way of a hydraulic excavator which is a typical example of crawler type vehicles, it is to be understood that the present invention can be widely applied to other crawler type vehicles such as hydraulic cranes or the like.

INDUSTRIAL APPLICABILITY

As clear from the foregoing detailed description, according to the present invention, the sealing device which seals up a gap space between a bush and each outer link portion of track links of a crawler belt is arranged to press a seal ring resiliently against the outer link portion and an end face of the bush by means of a coned disc spring. Therefore, a thrust load which is imposed on the track links is supported by the coned disc spring which is interposed between the outer link portion and the bush, to reduce the transmission of the thrust load to the seal ring. At the same time, by resilient force of the coned disc spring, the seal ring is resiliently pressed against the outer link portion and confronting end face of the bush to seal up the gap space between the outer link portion and the end face of the bush through surface contact therewith.

Consequently, it becomes possible to reduce abrasive wear or damages to the seal ring even in case the seal ring is held in sliding contact with an end face of a bush under an increased surface pressure, thereby preventing fatigue breakdown of the seal ring to ensure an extended service life therefor. In addition, when the crawler belt is in turning motion, the coned disc spring serves to apply a suitable degree of sliding resistance to the outer link portion and the bush to stabilize the movements of the crawler belt by suppressing flapping movements which would otherwise occur to the crawler belt as explained hereinbefore in connection with the prior art. Besides, as the coned disc ring is resiliently pressed against an outer link portion and a confronting end face of a bush by the coned disc spring, the gap space between these parts can be sealed up by the seal ring in favorable conditions.

Furthermore, according to the present invention, the coned disc spring has its outer peripheral end abutted against a bottom end surface of a seal anchor hole which is provided in an outer link portion and has its inner peripheral end abutted against an end face of a bush. Therefore, the seal ring is strongly pushed against both the outer link portion and the end face of the bush to seal up the gap space between these parts in satisfactory conditions.

What is claimed is:

1. A crawler belt including right and left track links each consisting of a large number of track links successively connected in an endless form, each one of said track links being provided with an outer link portion at one longitudinal end and an inner link portion at an opposite longitudinal end thereof; bushes each located transversely between said inner link portions of said right and left track links and having opposite ends thereof disposed in face to face relation with outer link portions; connecting pins inserted in said bushes and having opposite ends thereof fitted in and connected to said outer link portions; and a sealing device located around a connecting pin in a gap space between an outer link portion of said track links and an opposing one of said bushes, characterized in that:

said outer link portion is provided with a pin fitting hole to receive an end portion of said connecting pin, and a seal anchor hole formed coaxially with and in a larger diameter than said pin fitting hole and provided with a bottom end surface and inner peripheral surface, and adapted to hold said sealing device; and said sealing device is constituted by a seal ring formed of a resilient material and in a ring-like shape having a diameter larger than that of said connecting pin and set in position between an inner peripheral surface of said seal anchor hole and said opposing end face of said bush, and a coned disc spring interposed in a compressively deformable state between and abutting against said bottom end surface of said seal anchor hole and said end face of said bush at outer and inner peripheral ends of maximum and minimum diameters, respectively, and adapted to press said seal ring resiliently against said inner peripheral surface of said seal anchor hole and said end face of said bush.

2. A crawler belt as defined in claim 1, wherein said end face of said bush is constituted by a flat surface disposed normal to a longitudinal axis thereof.

3. A crawler belt as defined in claim 1, wherein said end face of said bush is constituted by a seal ring abutting surface formed annularly in radially outer portions of said end face, and a circular coned disc spring abutting surface formed radially inward and projected axially outward of said seal ring abutting surface.

4. A crawler belt as defined in claim 3, wherein both of said seal ring abutting surface and said coned disc spring abutting surface are constituted by flat surfaces disposed normal to a longitudinal axis of said bush but shifted from each other in the axial direction to provide an annular stepped wall portion therebetween.

5. A crawler belt as defined in claim 3, wherein said seal ring abutting surface is formed in a conical shape.

6. A crawler belt as defined in claim 1, wherein said coned disc spring is arranged to be capable of compressive deformation through a maximum flexural deformation distance (L1) or (L1') which is in the relationship of (S1<L1 or S1<L1') relative to a width (S1) of a gap space between said outer and inner link portions of said track links.

7. A crawler belt as defined in claim 1, wherein said coned disc spring is arranged to have an initial flexural deformation distance (L2) or (L2') which is in the relationship of (L2>S1 or L2'>S1) relative to a width (S1) of a gap space between said outer and inner link portions of said track links.

8. A crawler belt as defined in claim 1, wherein said seal ring and said coned disc spring are arranged to have jointly an initial flexural deformation distance (P) or (P') which is larger than a width (S1) of a gap space between said outer and inner link portions of said track links and set in the relationship of (P>S1 or P'>S1).

9. A crawler belt as defined in claim 1, wherein said coned disc spring is set between said connecting pin and seal search anchor hole, having an outer peripheral end portion thereof spaced from said seal anchor hole in radial direction by a gap of width (S2) or (S2') which is smaller than a radial gap space (S3) or (S3') between an inner peripheral end portion of said coned disc spring and said connecting pin, in the relationship of (S2<S3 or S2'<S3').

10. A crawler belt as defined in claim 1, wherein said seal ring and said coned disc spring are formed separately of each other and set in position in an assembled state between said outer link portion and said end face of said bush.

11. A crawler belt as defined in claim 1, wherein said seal ring and said coned disc spring are formed into and provided as one integral structure.

* * * * *